(12) United States Patent
Valiulis

(10) Patent No.: US 6,367,749 B2
(45) Date of Patent: Apr. 9, 2002

(54) STAND BASE

(75) Inventor: Stanley C. Valiulis, Rockford, IL (US)

(73) Assignee: Southern Imperial, Inc., Rockford, IL (US)

( * ) Notice: Subject to any disclaimer, the term of this patent is extended or adjusted under 35 U.S.C. 154(b) by 0 days.

(21) Appl. No.: 09/813,474

(22) Filed: Mar. 21, 2001

(51) Int. Cl.[7] ............................................... F16M 11/20
(52) U.S. Cl. ........................ 248/188; 248/519; 248/151; 248/188.7; 248/160; 248/163.1; 211/85.3; 211/33; 211/190
(58) Field of Search ................................. 248/519, 151, 248/188, 188.7, 160, 163.1; 211/85.3, 33, 190, 195, 205, 207

(56) References Cited

U.S. PATENT DOCUMENTS

| | | | | |
|---|---|---|---|---|
| 1,747,951 A | * | 2/1930 | Reichert | |
| 4,261,138 A | * | 4/1981 | St. George Syms | 47/40.5 |
| 4,821,986 A | * | 4/1989 | White | 248/188.7 |
| D330,133 S | | 10/1992 | Lucht | D6/498 |
| 5,288,045 A | * | 2/1994 | Edwards et al. | 248/188.7 |
| 5,439,269 A | * | 8/1995 | Cheng | 297/440.1 |
| 5,527,010 A | | 6/1996 | Kao | 248/519 |
| D401,434 S | * | 11/1998 | Meteer | D6/399 |
| 5,869,151 A | | 2/1999 | Chong | 428/18 |
| D410,804 S | * | 6/1999 | Murray | D6/455 |
| 5,938,168 A | * | 8/1999 | Adams | 248/523 |
| 6,234,434 B1 | * | 5/2001 | Avinger | 248/188.7 |

* cited by examiner

Primary Examiner—Kimberly T. Wood
Assistant Examiner—Steven Marsh
(74) Attorney, Agent, or Firm—Leydig, Voit & Mayer, LTD

(57) ABSTRACT

The present invention provides a stand base comprising a central hub and a plurality of legs removably attached to the central hub. Each of the legs depends radially outward and downwardly from the central hub. The base stand is adapted to receive the central vertical support of a display rack and provide both lateral and vertical support thereto. The plurality of legs may be detached from the central hub and packaged together in a nested configuration that is compact for shipping and storage. Each of the plurality of legs has an arcuate shape so that the plurality of legs provide a natural resiliency and upward bias when a load is placed on the display rack. The base provides support in either a normal-load mode or a high-load mode for improved vertical and lateral support of the display rack.

23 Claims, 8 Drawing Sheets

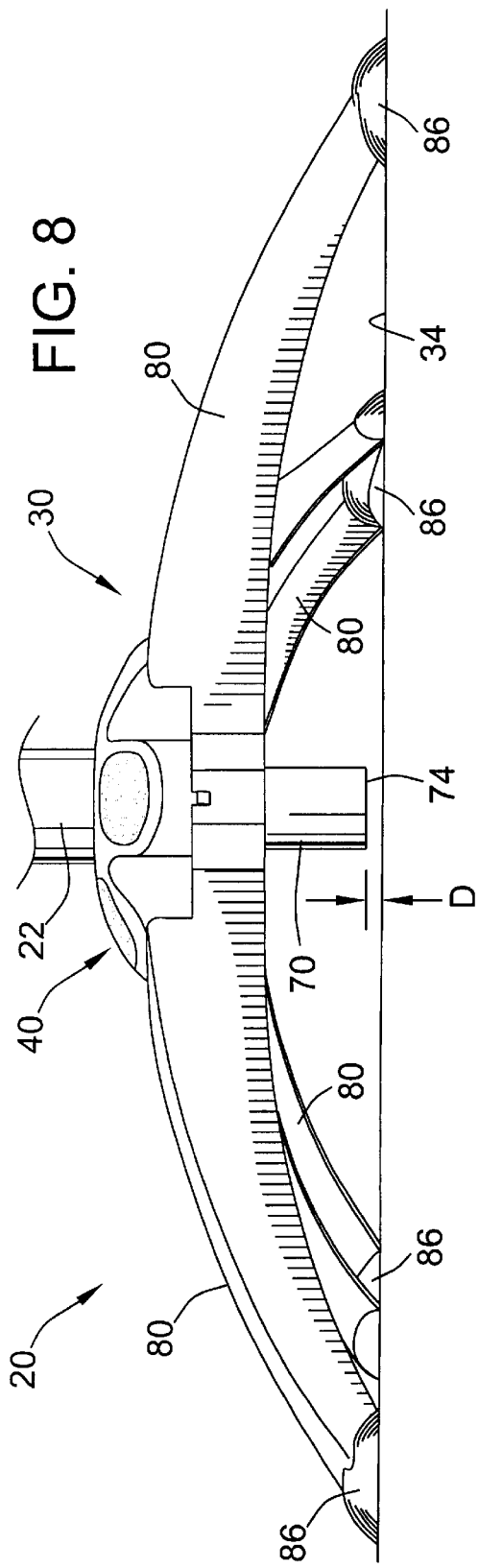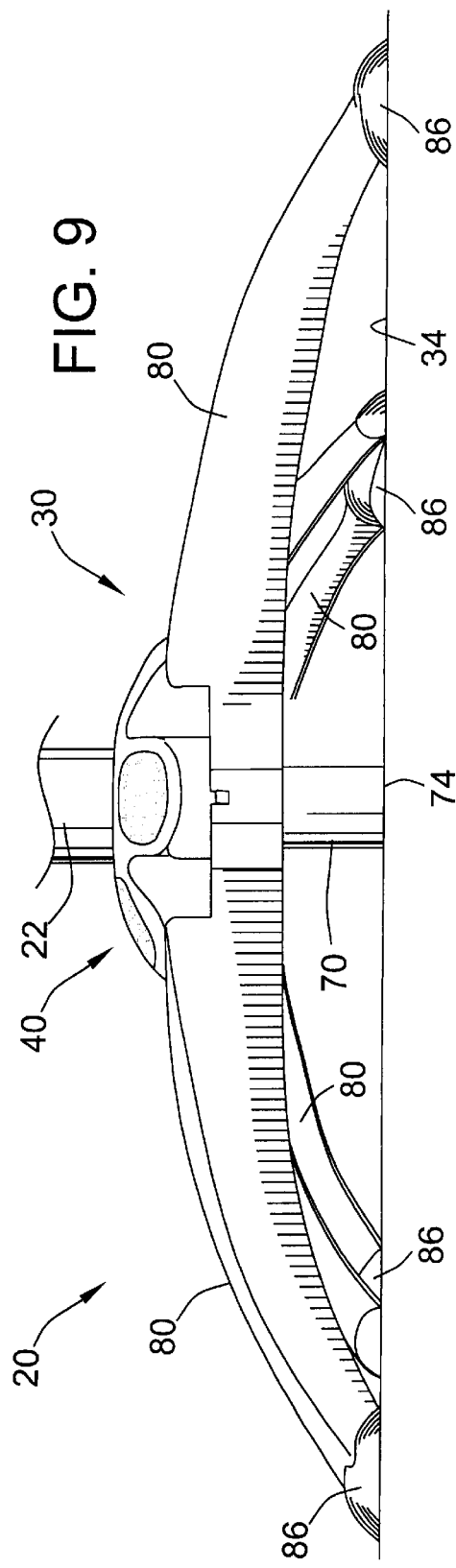

STAND BASE

FIELD OF THE INVENTION

The present relates generally to merchandise display racks or stands, and more particularly relates to a base for merchandise display stands.

BACKGROUND OF THE INVENTION

Common merchandise display racks or stands typically include a central vertical mast for attaching various display apparatus such as carousels, hooks, baskets or shelves. The vertical mast and display apparatus of these devices are supported off the ground by a base. Stand bases are generally of the disc-type or leg-type. For example, the disc-type bases typically comprise a circular disc-shaped object and can be seen in the 1999 Southern Imperial Catalog, pages 69–73. The leg-type bases generally include a plurality of legs projecting radially from a central point, such as in tripod, to provide lateral support to the display rack. Such bases are shown in the 1999 Southern Imperial Catalog, pages 78 and 84.

Both the disc-type and leg-type bases provide support to the stand, and more particularly to the vertical support, to prevent the stand from tipping. It is axiomatic that the further these discs or legs project radially outward, the more lateral support is provided for the rack. Discs and legs of a given size provide a certain amount of lateral support to the stand. Unfortunately, the wider the base becomes the more difficult and expensive packaging and shipping these stands become. Large bases require large packages, often resulting in a substantial amount of wasted packing space, inherently increasing shipping costs. Therefore, it is ideal to provide a stand base that both provides adequate lateral support and is also compact for shipping and storage.

Stand bases must also provide adequate vertical support to the display rack so that it may hold merchandise products having relatively large weight. With regard to vertical support, disc-shaped bases are beneficial because they distribute the weight over a larger contact area relative to comparable leg-type bases where each leg alone must carry its share of the load. However, disc-shaped bases require more material than comparable leg-type bases, increasing the weight and cost of the base and overall stand which also makes packaging and shipping the stands more difficult. Yet, when large loads are placed on a leg-type base, the legs may deform, crack or break prematurely. Weakness in any one of the legs can cause the stand base to fail to provide adequate vertical support, as well as adequate lateral support.

BRIEF SUMMARY OF THE INVENTION

In light of the foregoing, it is an object of the present invention to provide a stand base having a wide breadth for superior lateral support, yet also may be organized in a small and compact package for shipping or storing.

It also is an object of the present invention to provide a stand base that reduces the amount of material used, yet provides excellent vertical as well as lateral support.

It is another object of the present invention to provide a stand base that delivers increased lateral support as the weight of the stand and its contents increases.

It is yet another object of the present invention to provide a stand base that provides vertical support in two different load modes to protect the integrity of the legs and ensure adequate vertical and lateral support.

In accordance with these objects the present invention provides a stand base comprising a central hub and a plurality of legs removably attached to the central hub. Each of the legs depends radially outward and downwardly from the central hub. The base stand is adapted to receive the central vertical mast of a display rack and provide both lateral and vertical support thereto.

It is a feature of the present invention to detach the plurality of legs from the central hub and package the same together in a nested configuration that is compact for shipping and storage.

It is another feature of the present invention to provide each of the plurality of legs with an arcuate shape so that the plurality of legs provide a natural resiliency and upward bias when a load is placed on the display stand.

It is another feature of the present invention that the width of the base widens with increased vertical load thereon, thereby increasing the amount of lateral support as a function of the load carried by the base.

It is yet another feature of the present invention to provide a stand base that provides vertical support in either a normal-load mode or a high-load mode. In the normal-load mode, the plurality of legs support the central hub, central vertical mast and display apparatus off the floor during typical display rack loads. In the high-load mode, a sufficient amount of weight is placed on the display stand to force the legs to flex and the central hub to move downwardly towards the floor. In the high-load mode the central hub will engage the floor to provide a majority of the vertical support of the merchandise stand.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 8 and 9 are partially cut-away views illustrating the operation of the stand base depicted in FIG. 2.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
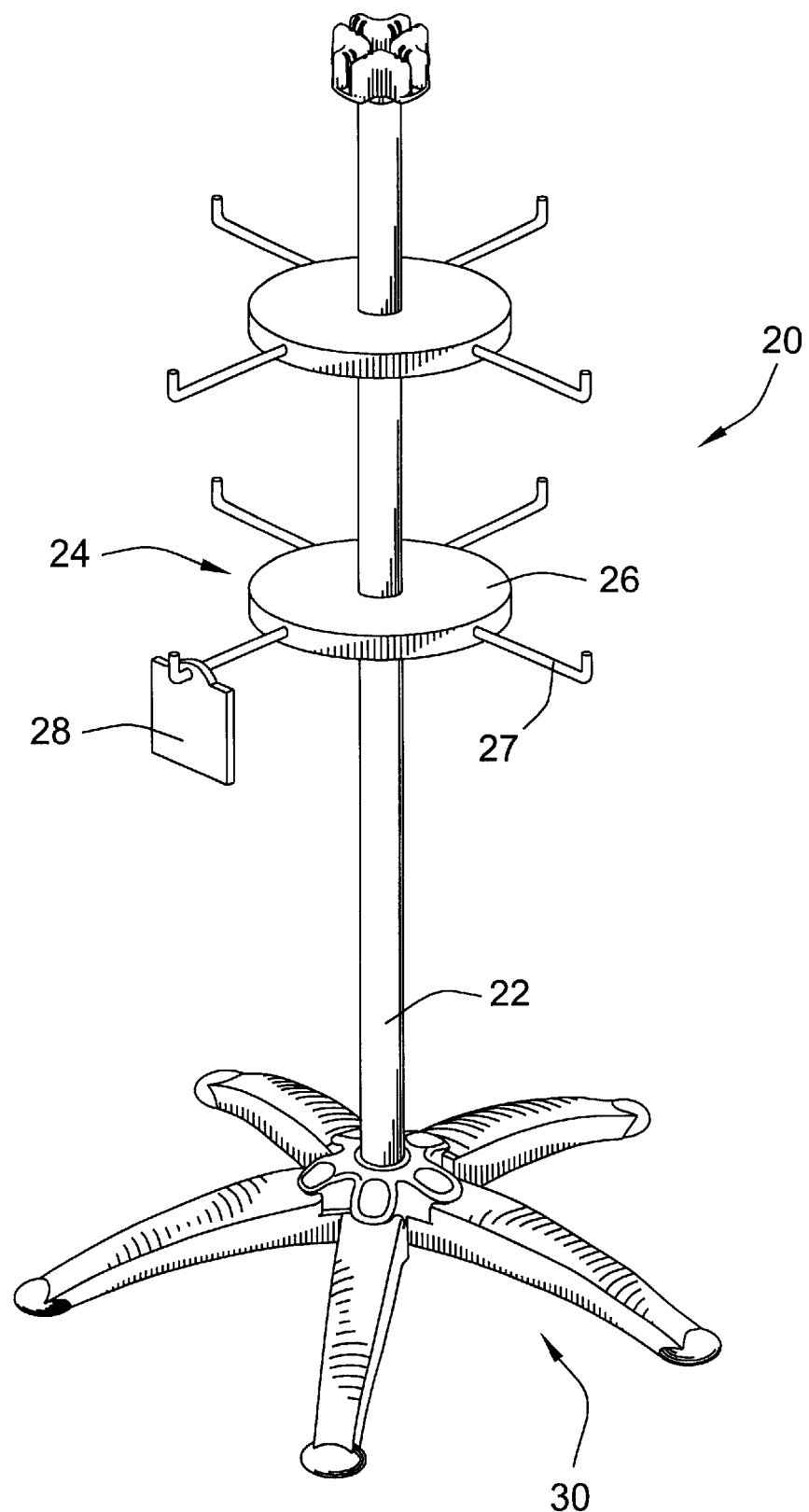
FIG. 1 illustrates a retail display stand having a stand base constructed in accordance with the teachings of the present invention.
Figure 2:
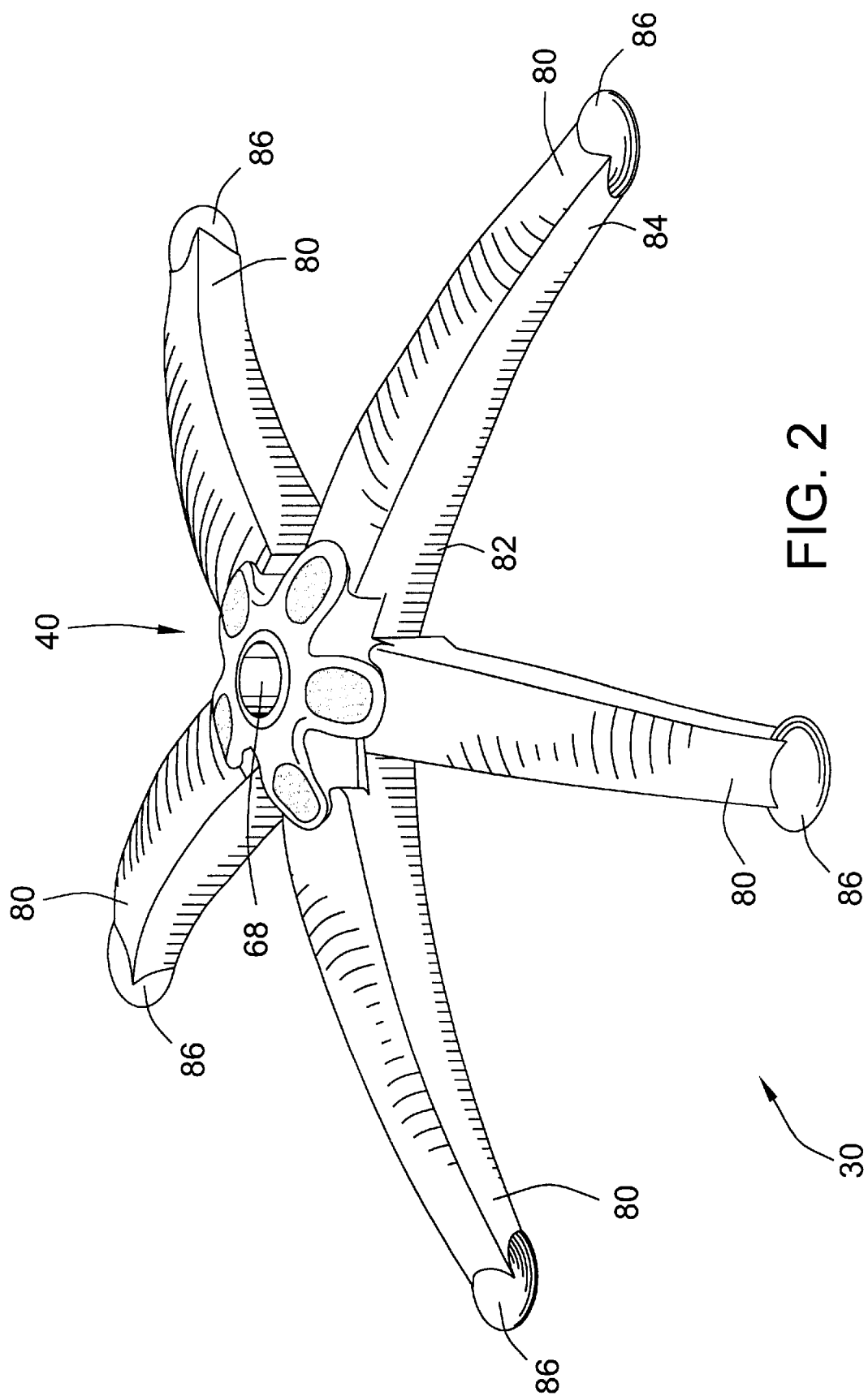
FIG. 2 illustrates the stand base depicted in FIG. 1.

FIG. 1 illustrates a merchandise display stand 20 in accordance with the teachings of the invention comprising a central tubular vertical mast 22 having a plurality of display apparatus 24 attached thereto. Various display apparatus may be used, such as carousels, rotors and hooks, wire spinners, wire stems, J-hooks, baskets, dumps, bowls, clipper displays or shelves. The display apparatus shown in FIG. 1 comprise several shelf members 26 attached to the tubular support, the shelf members having a plurality of wire hooks 27 attached thereto. The shelf members and wire hooks are adapted to mount various product or merchandise 28 above the ground for viewing by the consumer. The central mast, display apparatus and merchandise are supported off the floor by the stand base 30 of the present invention, an embodiment of which is illustrated in FIG. 2.

The stand base 30 generally comprises a central hub 40 and a plurality of legs 80 extending radially outward therefrom. The legs 80 have a generally arcuate shape and have a first inner end 82 attached to the central hub 40 and a second outer end 84 having feet 86 contacting the floor 34 (FIGS. 8 and 9). The central hub 40 includes a cavity 68 for receiving the tubular mast 22 of the merchandise display stand 20. Preferably, the base 30 is molded from a generally rigid plastic which provides the necessary strength and elasticity of carrying out the invention. It can also be seen that the legs 30 are identically shaped, such that when detached from the hub 40, they may be nested together in a compact configuration for shipping.

Figure 3:
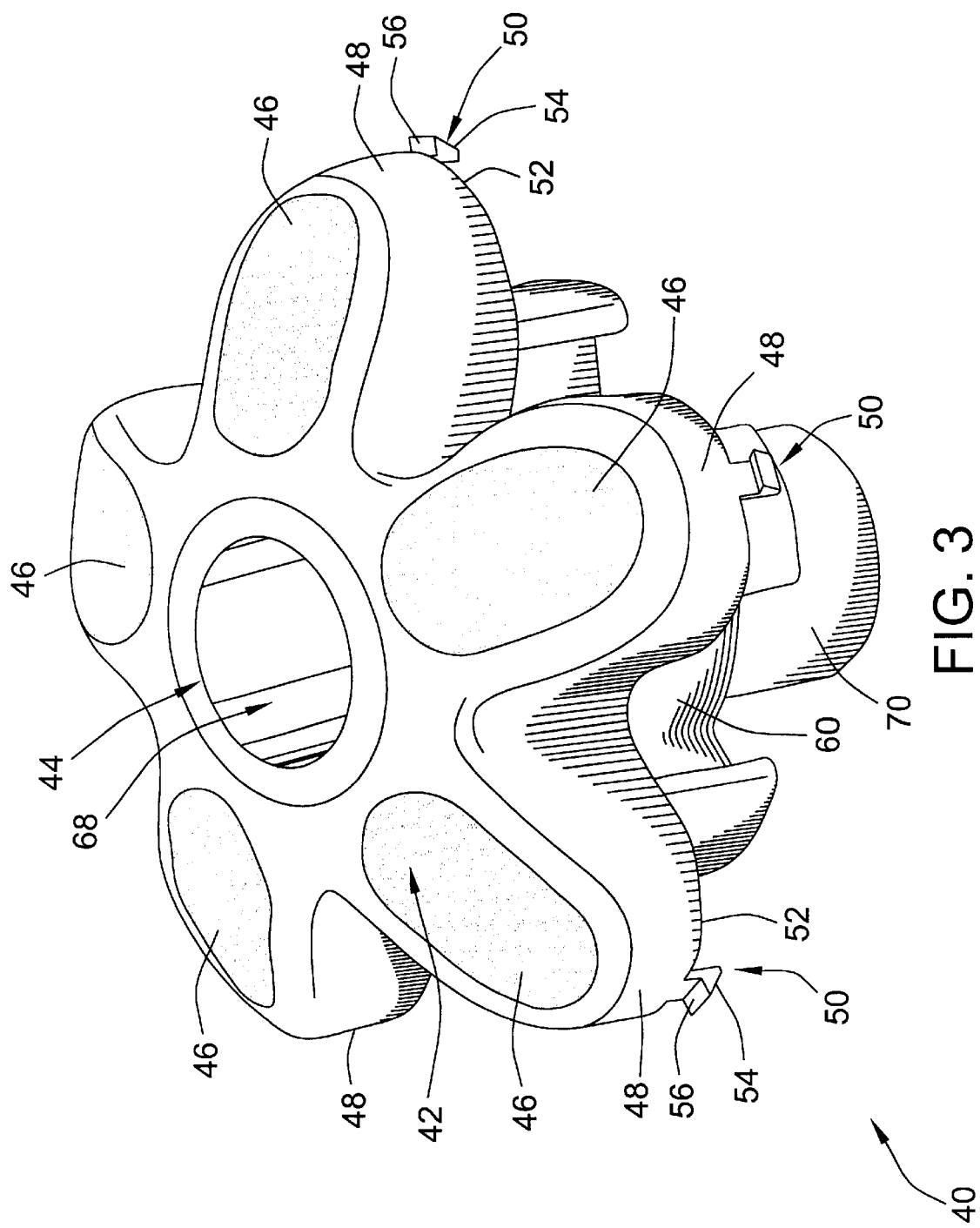
FIG. 3 illustrates a top perspective view of the central hub of the stand base depicted in FIG. 2.
Figure 4:
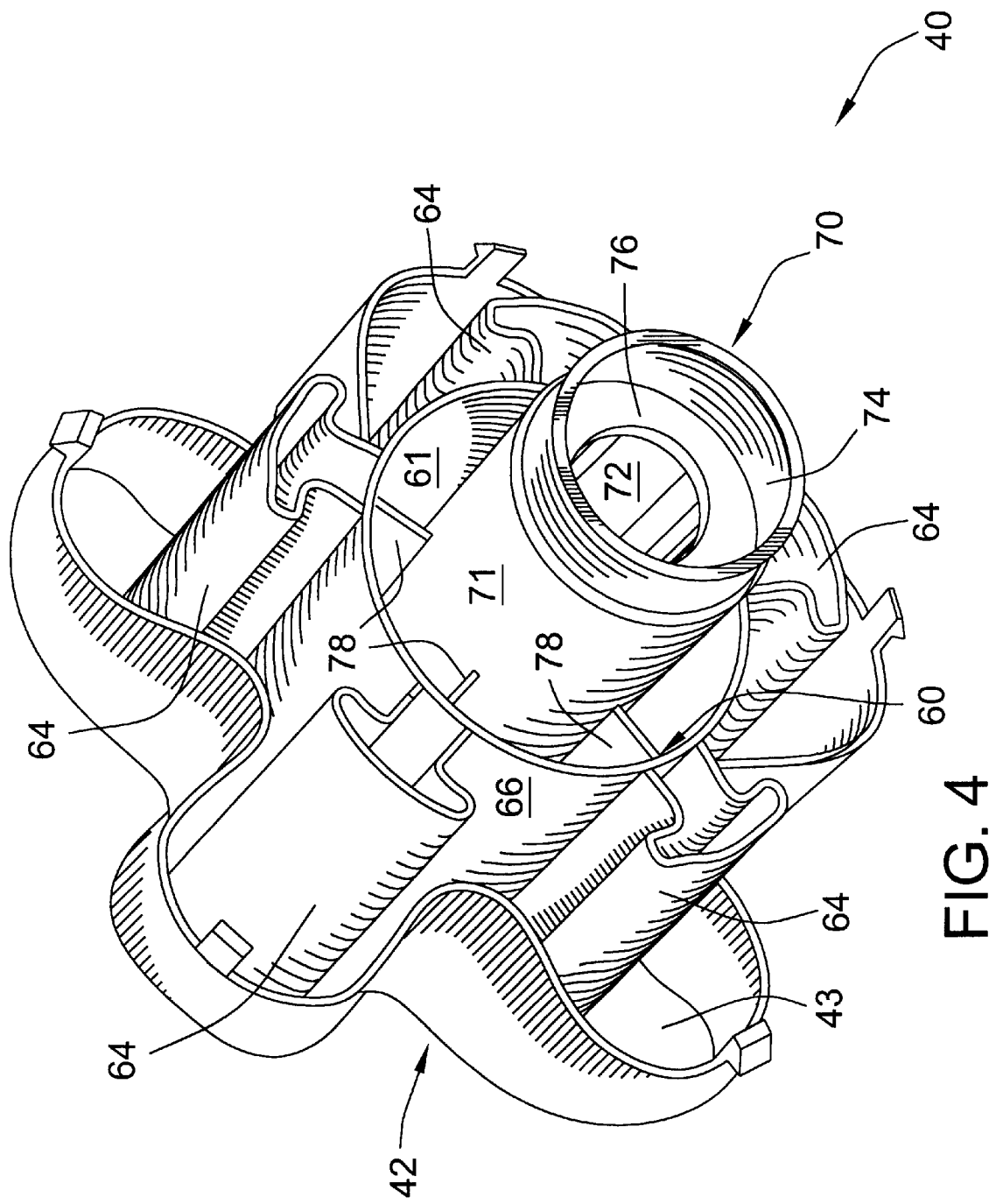
FIG. 4 illustrates a bottom perspective view of the central hub of FIG. 3.
Figure 5:
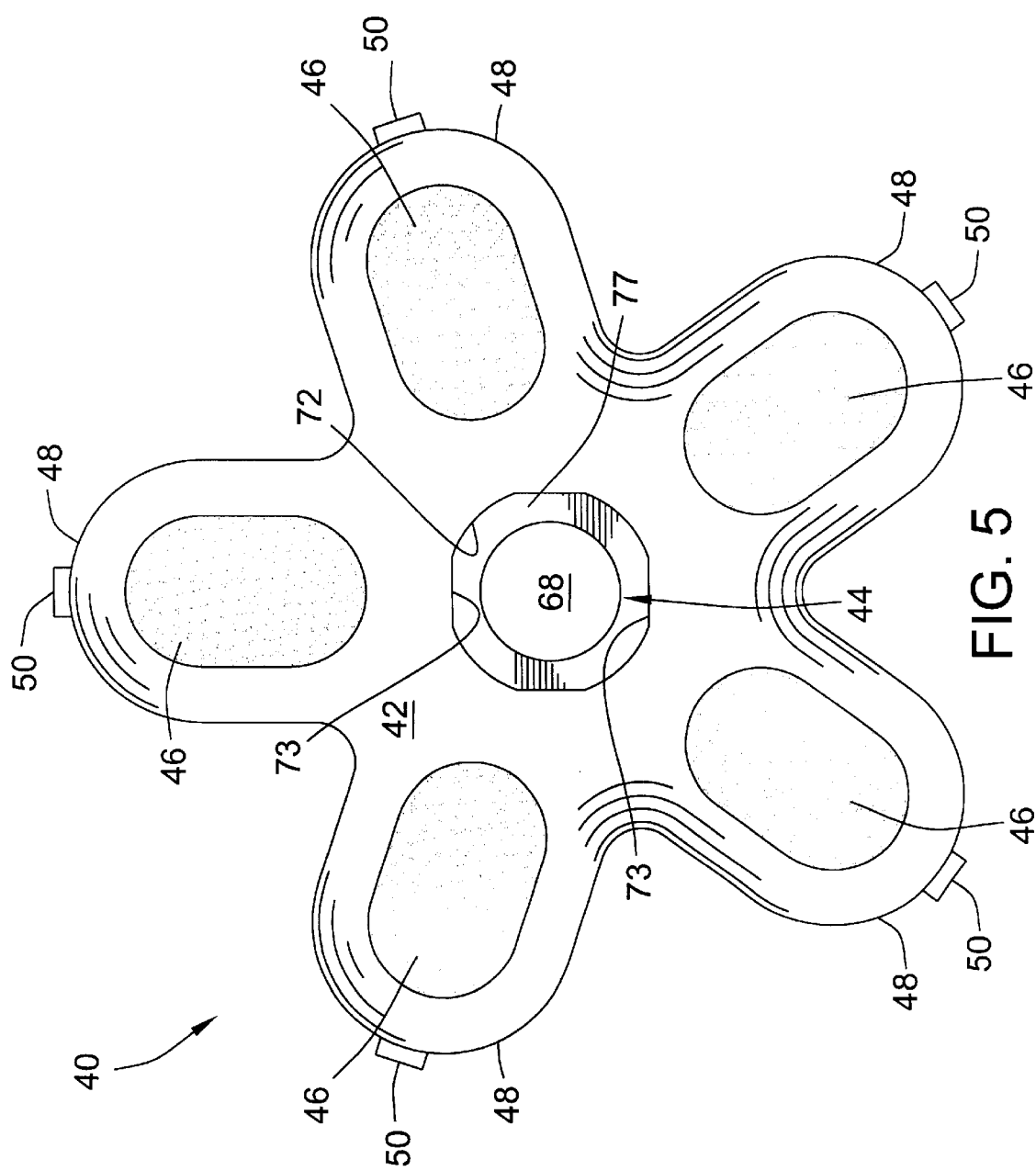
FIG. 5 illustrates a top view of the central hub depicted in FIGS. 3 and 4.

FIGS. 3, 4 and 5 illustrate the central hub 40 of the stand base 30 according to an embodiment of the invention. The upper surface of the central hub 40 is defined by a hood or cover 42. The cover includes a central aperture 44 and is generally flower shaped, having a plurality of petals 46 corresponding with the plurality of legs 80 removably attached to the central hub 40 (FIG. 2). The petals 46 are symmetrically arranged about the aperture 44, and hence the central axis of the stand defined by the central mast 22. Each petal 46 has an outer curved surface 48 having a locking tab 50 extending from a downward edge 52 of the cover 42 and the curved surface 48. Each locking tab 50 extends downwardly and includes an angled guide surface 54 and a flat gripping surface 56 which allow the plurality of legs to be removably attached to the central hub 40, as will be discussed in more detail herein.

The central hub 40 further includes a cylindrical body 60 connected to the underside 43 of the cover 42 and extending downward therefrom. The cylindrical body 60 is concentric with the central vertical axis. A plurality of elongate hollow T-shaped projections 64 are connected to the outer surface 66 of the cylindrical body 60 and span the vertical length thereof, connecting to the underside 43 of the cover 42. The hollow T-shaped projections 64 are symmetrically spaced to correspond with the plurality of legs 80, and each are sized to be received within a T-shaped channel (FIG. 6) on a leg when assembling the stand base 30.

The central hub 40 further includes a cavity 68 for receiving the central mast 22, the cavity 68 defined by a tubular sleeve 70. The tubular sleeve 70 has an inner surface 72 that meets the cover 42 to define the cavity 68 and the aperture 44. The tubular sleeve 70 is connected to the underside 43 of the cover 42 and extends downwardly therefrom. The tubular sleeve 70 is sized to closely correspond with the vertical mast 22 of the stand 20 so that the mast 22 may be received and retained within the tubular sleeve 70. As best seen in FIG. 5, the inner surface 72 includes a plurality of symmetrically spaced flats 73 to progressively reduce the effective inner diameter of the tubular sleeve 70. The flats 73 taper as they extend downwardly. The flats 73 reduce the area of contact between the central mast 22 and the tubular sleeve 70 making insertion and removal easier by virtue of less friction. It will be understood that the central hub may be adapted to receive a vertical support of any shape or structure, and may retain the same by various structures well know in the art such as pins, screws, latches, clamps, other friction fits and the like.

In the illustrated embodiment, a downward end 74 of the tubular sleeve 70 includes a reduced diameter portion to prevent the mast 22 from sliding all the way through the cavity 68 defined by tubular sleeve 70. As shown in FIGS. 4 and 5, a ring 76 extends radially inward from the inner surface 72 of the tubular sleeve 70 proximate the downward end 74 of the tubular sleeve 70. The ring 76 provides a horizontally disposed surface 77 on which the central tubular mast 22 may rest.

As best seen in FIG. 4, the tubular sleeve 70 is concentric with the cylindrical body 60 of the central hub 40. A plurality of support fins 78 are connected to and project radially outward from an outer surface 71 of the tubular sleeve 70. The plurality of support fins 78 correspond with the plurality of hollow T-shaped projections 64 of the stand base 30. The support fins 78 are radially aligned with the hollow T-shaped projections 64 and connect the outer surface 48 of the tubular sleeve 70 to the inner surface 61 of the cylindrical body 60, thereby providing radial or lateral support to the cylindrical body 60 and T-shaped projections 64 at positions corresponding to where the legs 80 are attached to the central hub 40.

Figure 6:
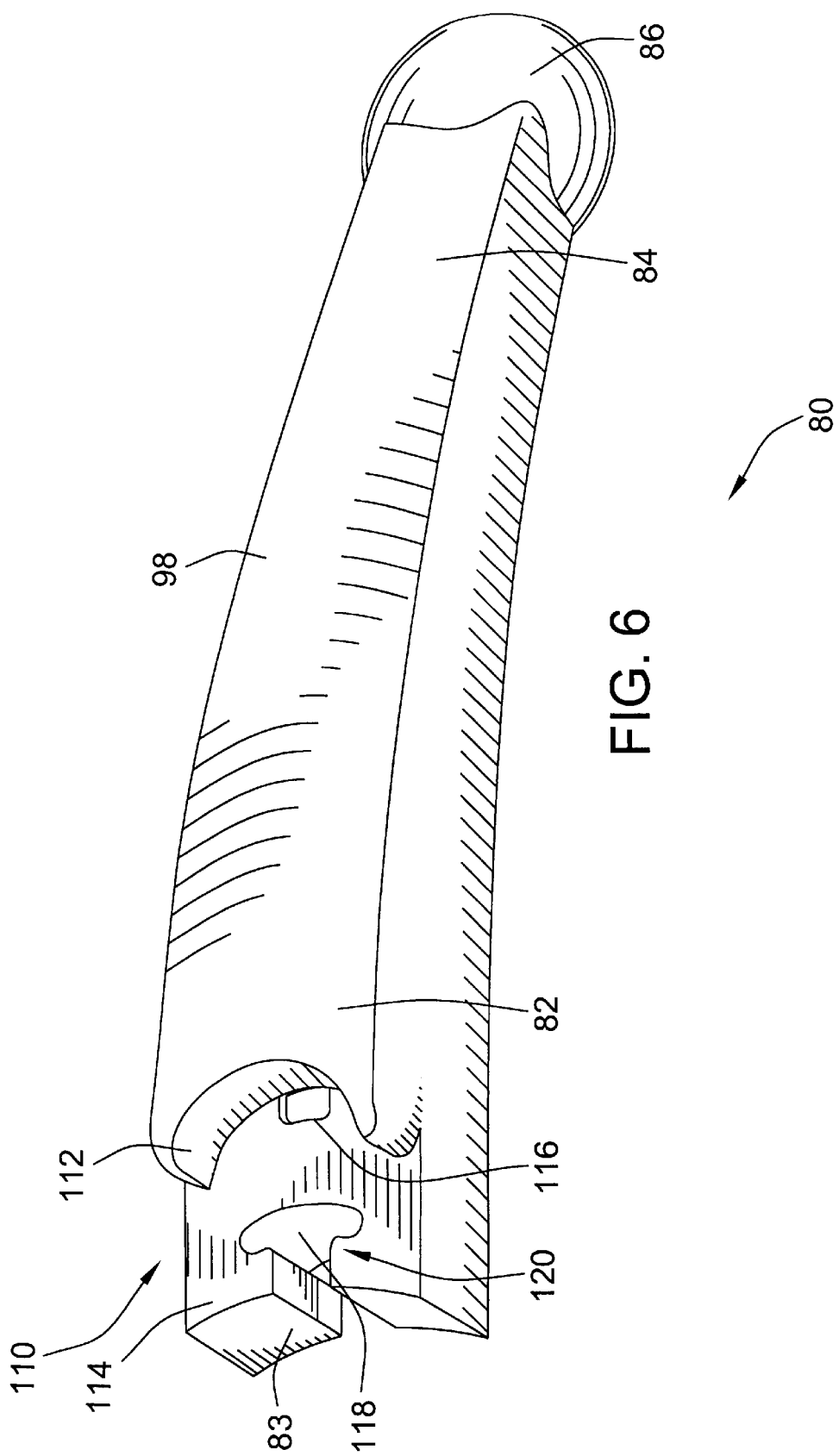
FIG. 6 illustrates a perspective view of a stand leg depicted in FIG. 2.
Figure 7:
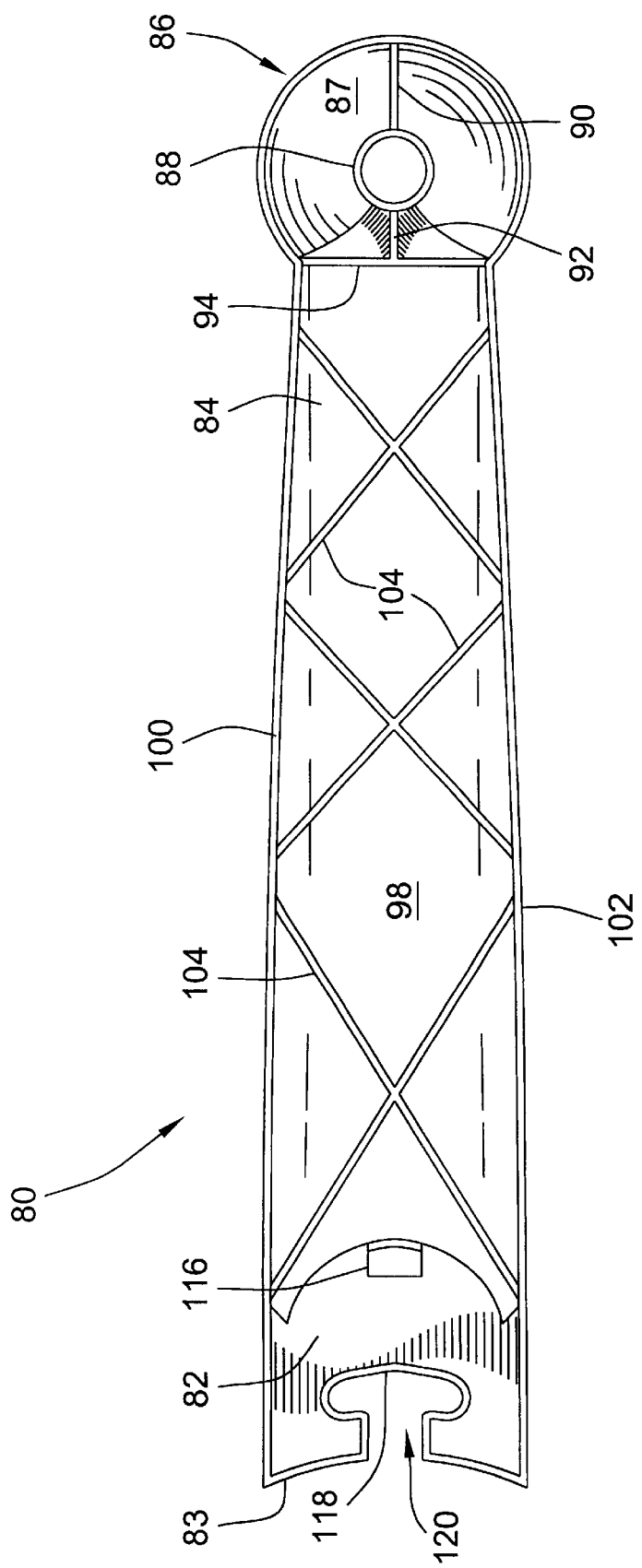
FIG. 7 illustrates a bottom view of the stand leg of FIG. 6.

FIG. 6 shows one of the legs 80 constructed according to an embodiment of the present invention. The leg 80 is generally arcuate in shape and includes a first inner end 82 and a second outer end 84. The second outer end 84 of each leg 80 includes a foot 86. In the embodiment illustrated, the foot 86 is semi-spherical to ensure even engagement of the floor in all directions, and in conjunction with the large size allows each foot 86 to provide support over at least 180° range. As can be seen in FIG. 7, the inside surface 87 of the semi-spherical foot 86 includes an inner cylinder 88 connected to the inside surface 87 of the foot 86. A first rib 90 connects the inner cylinder 88 and the inside surface 87 of the foot 86 to provide lateral support. Similarly, a second rib 92 connects the inner cylinder 88 to a wall 94 projecting downwardly from the second end 84 of the leg 80, also to provide lateral support to the inner cylinder 88. The inner cylinder 88 is adapted to receive the post of a caster, wheel, rubber pad, or the like, i.e. anything which might be interposed between the and foot 86 and the ground. Alternatively, a post may be provided in the floor or other surface to which the stand 20 is to be placed upon in order to secure the base 30 to the floor and protect against unwanted rotation or sliding along the floor.

The leg 80 is substantially hollow as defined by a top wall 98 and two substantially parallel sidewalls 100, 102. As can be seen in FIG. 7, the leg 80 is bowed, i.e. as one progresses from the first inner end 82 to the second outer end 84 the width of the leg 80 widens as it nears the middle and narrows again as it approaches a second outer end 84. It can also be seen that a plurality of criss-crossing ribs 104 are connected to the underside surfaces of the top wall 98 and sidewalls 100, 102 to provide rigidity and support to the leg 80.

Focusing on the inner end 82 of the leg 80 best seen in FIGS. 6 and 7, the inner end 82 includes a notched portion 110 that corresponds with the petals 46 of the central hub's cover 42. The notched portion 110 is defined by a curved vertical wall 112 and a horizontal top wall 114. It can be seen that the curved vertical wall 112 is curved to correspond with the curvature of the cover's petals 46, and specifically the petal's outer curved surface 48 (FIG. 3). The horizontal top wall 114 includes a rectangular aperture 116. The aperture 116 corresponds with the locking tab 50 projecting downwardly from the petals 46 (FIG. 3). It can also be seen that the inner end 82 of the leg 80 includes a curved inner end wall 83. The curved inner end wall 83 is curved to correspond with the cylindrical body 60 of the central hub 40 (FIGS. 3 and 4). The horizontal top wall 114 and curved inner end wall 83 cooperate with a channel wall 118 to define a T-shaped channel 120 in the first inner end 82 of the leg 80. The T-shaped channel 120 corresponds with the hollow T-shaped projections 64 projecting from the cylindrical body 60 of the central hub 40 (FIGS. 3 and 4).

As is readily apparent from the figures, each of the plurality of arcuate legs 80 is attached to the central hub 40 at symmetrical positions. Each of the petals 46 of the cover 42 represent a position corresponding with each of the legs 80, wherein the downwardly depending locking tab 50 and hollow T-shaped projections 64 exist for removably attaching the legs 80 to the central hub 40. To attach the legs 80, the legs are positioned below the central hub 40, with the bottom of the hollow T-shaped projections 64 aligned with the T-shaped channel 120 defined in the horizontal top wall 114 of the notched portion 110 of the inner end 82 of the leg 80. The leg 80 is moved upwardly such that the hollow T-shaped projections 64 enter and engage the T-shaped channel 120. As the horizontal top wall 114 of the notched portion 110 approaches the central hub's cover 42, a downward end of the locking tab 50 naturally enters the rectangular aperture 116 in the horizontal top wall 114. The angled guide surface 54 of the locking tab 50 forces the locking tab 50 and outer curved surface 48 of the petal 46 to deform radially inward as the locking tab 50 extends further through the rectangular aperture 116. When the downward end 52 of the petal 46 engages the horizontal top wall 114 of the notched portion 110, the flat gripping surface 56 of the locking tab 50 has extended fully through the rectangular aperture 116 and the locking tab 50 and outer curved surface 48 of the petal 46 naturally return to their original relaxed position. Thus, the flat gripping surface 56 engages the underside of the horizontal top wall 114 of the notched portion 110 to removably attach the leg 80 to the central hub 40. The outer curved surface 48 of the petal 46 and the curved vertical wall 112 fit closely together, as do the outer surface 62 of the cylindrical body 60 and the curved inner end wall 83 of the leg 80. The hollow T-shaped projections 64 extend fully through the T-shaped channel 120 defined in the inner end 82 of the leg 80, thereby providing both vertical and radial support to the connection between the leg 80 and central hub 40. To remove the leg 80, one may reach between the sidewalls 100, 102 of the leg 80 to access the locking tab 50 which may be depressed radially inward, so that the flat gripping surface 56 is vertically aligned with the rectangular aperture 116 and can pass therethrough allowing the leg 80 to be removed from the central hub 40.

Turning to FIGS. 8 and 9, the stand base 30 is shown fully assembled and upright, having a central mast 22 (partially cut-away) extending vertically therefrom. It can be seen that one of the five legs 80 has been removed revealing the side of the central hub 40. The legs 80 are generally arcuate in shape, and extend radially outwardly and downwardly from the central hub 40 ending at the leg's foot 86. The bottom edges of the feet 86 are generally horizontal and engaging the floor 34. The central mast 22 extends downwardly into the central hub's cavity 68, i.e. through the aperture 44 in the cover 42 and the tubular sleeve 70. The ring 76 of the tubular sleeve 70 prevents the mast 22 from extending further downward. It can be seen in FIG. 8 that the legs 80 extend downward from the central hub 40 a distance greater than the tubular sleeve 70 of the central hub 40, as the tubular sleeve 70 is supported above the ground. The downward end 74 of the tubular sleeve 70 is supported above the ground a distance D, which is preferably 0.01 to 2 inches and most preferably 0.125 to 0.5 inches but is dependent on the overall size of the stand 20, the base 30 and the weight of the merchandise to be displayed.

In accordance with an aspect of the present invention, the stand base uniquely provides increased lateral and vertical support to the stand as the weight of the stand and its contents increases. It will be readily recognized that the legs 80 provide lateral support as they project radially outward from the central vertical support. Should the display stand 20 and its central mast 22 attempt to tip over, the legs 80 may bend slightly to accommodate some rotation, but will generally remain rigid to prevent the stand 20 and mast 22 from rotating more than a few degrees, thereby preventing the stand 20 from tipping. As previously described and as shown in the drawings, the legs 80 are generally of an arcuate shape extending outwardly and downwardly from the central hub 40. This arcuate shape of the legs 80 can be seen in FIG. 8, which shows the stand base 30 supporting the central mast 22.

The arcuate shape provides a natural resiliency and upward bias on the display stand. FIG. 8 represents a normal-load mode, wherein no or very little merchandise 28, or merchandise having relatively low weight, are mounted to the display apparatus 24. It can be seen that the legs 80 support the central hub 40, including its tubular sleeve 70, off the ground 34. As a larger downward force is placed upon the central hub 40 (by virtue of more or heavier merchandise products) the legs 80 flex against their natural arcuate shape. The criss-crossing ribs 104 (FIG. 7) act against and restrict the flexure of the legs 80, as does the natural resiliency of the material used to construct legs 80. As a result of this bending, the legs 80 become somewhat straighter and the feet 86 80 move further apart, thereby increasing the width of the stand base 30. It will be readily understood by those having skill in the art that the increased width provides increased lateral support for the display stand 20. As even more downward force is placed on the central hub 40, the legs 80 continue to flex against their natural arc, which is eventually limited by the tubular sleeve 70 contacting the floor 34, as will be discussed in greater detail below with reference to FIG. 9 depicting the flexure of the legs 80 and a wider base 30. It can therefore be seen that the stand base 30 of the present invention provides increased lateral support to the display stand 20 as a function of increased load on the stand 20 resulting from larger downward forces placed on the central hub 40 of the stand base 30 causing the legs 80 to flex and widen the width of the base 30.

In accordance with another aspect of the present invention, the stand base 30 provides vertical support in either a normal-load mode or a high-load mode. When lightly loaded, the legs 80 of the stand base 30 support the entire stand 20 off the ground, i.e. the legs 80 provide the vertical support. FIG. 9 shows the stand 20 in a high-load mode. When large amounts of merchandise, or merely extremely heavy merchandise, are loaded onto the display apparatus 24, the increased weight places a larger downward load on the central hub 40. In the normal-load mode, the force was transferred from the hub 40 through to the legs 80 which provided adequate vertical support. In the high-load mode, however, the increased load causes the arcuate legs 80 to flex, but only to a pre-determined point. Whereas some prior art stands may deform, break or otherwise fail under such loads, the tubular sleeve 70 of the central hub 40 is designed to engage the floor when the legs have flexed a given amount, providing additional vertical support. While a small amount of bending in the leg 80 is permitted, this does not harm the integrity of the leg which is also supported by the ribs 104. The tubular sleeve 70 is designed to project downwardly from the cover 42 of the central hub 40 a distance somewhat less than the vertical distance the legs 80 project downwardly. In the high-load mode, the downward forced transmitted to the central mast 22 is transmitted directly downward through the tubular sleeve 70 which engages the floor 34 to provide adequate vertical support. Although the legs 80 no longer need to provide a majority of the vertical support, they continue to provide adequate lateral support to prevent the stand 20 from tipping. Further, the width of the base 30 will be at its greatest to provide increased lateral support to the stand 20 as previously described. It will be understood that other elements of the central hub, such as the cylindrical body, may project downward relative to the legs to engage the floor in the high-load mode without departing from the scope of the present invention.

Therefore, one of ordinary skill in the art can readily see from the foregoing description that the stand base of the present invention provides a stand base having a wide breadth for superior lateral support, yet also may be disassembled and organized in a small and compact package for shipping or storing. The base reduces the amount of material used, yet provides excellent vertical as well as lateral support. The stand base delivers increased lateral support as the weight of the stand and its contents increases. Similarly, the base provides vertical support in a normal-load mode and a high-load mode to protect the integrity of the legs and ensure adequate vertical and lateral support.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A base for a stand having a central vertical mast, the base providing vertical and lateral support to the stand, the base comprising:
   a central hub adapted to receive the vertical support;
   a plurality of legs removably attached to the central hub, each of the legs having an arcuate shape and projecting outwardly and downwardly from the central hub; and
   outer ends of the plurality of legs defining a base width, wherein the width increases in response to downward force on the central hub to provide increased lateral support.

2. The base as in claim 1, wherein the amount of lateral support varies as a function of the downward force placed on the base.

3. The base as in claim 1, wherein each leg is of resilient material and flexes against the leg's natural arc in response to downward force placed on the central hub.

4. The base as in claim 1, wherein each of the legs are generally hollow and defined by a top wall connecting two generally parallel side walls.

5. The base as in claim 4, further comprising a series of support ribs connected to the top wall and to the side walls.

6. The base as in claim 1, wherein each leg includes a semi-spherical foot at an outer end of the leg.

7. The base as in claim 1, wherein the legs support the central hub above the ground.

8. A base for a stand having a vertical mast, the base comprising:
   a central hub adapted to receive the mast;
   a plurality of legs removably attached to the central hub and projecting outwardly and downwardly therefrom;
   the base providing vertical support to the stand in two modes including:
   a) a normal-load mode wherein the plurality of legs provide the majority of vertical support; and
   b) a high-load mode wherein the central hub provides the majority of vertical support.

9. The base as in claim 8, wherein the plurality of legs support the central hub above the ground a vertical distance D measured from a downward most point of the central hub, and wherein the plurality of legs flex to vary D.

10. The base as in claim 9, wherein D is between 0.01 and 2 inches when in the normal-load mode.

11. The base as in claim 9, wherein D is zero when in the high-load mode.

12. The base as in claim 8, wherein outer ends of the plurality of legs define a base width, and wherein the width is greater in the high-load mode than in the normal-load mode.

13. A base for a retail merchandise stand having a central vertical mast and display apparatus attached to the vertical mast, the base comprising:
   a central hub comprising a cover, a cylindrical body connected to the cover and extending downward therefrom, and a tubular sleeve connected to the cover and extending downward therefrom, the cover, body and sleeve being concentric;
   a plurality of legs removably attached to the central hub, each of the legs having an arcuate shape and projecting outwardly and downwardly from the central hub to provide vertical and lateral support to the stand; and
   the central hub including a plurality of vertically disposed elongate projections, and the plurality of legs each including a channel corresponding with the elongate projections for receiving the projections therein.

14. The base as in claim 13, wherein the plurality of projections are generally T-shaped and attached to the outer surface of the cylindrical body, and wherein the plurality of leg's channels are generally T-shaped to correspond with the central hub's projections.

15. The base as in claim 13, wherein the central hub further includes a plurality of deflectable locking tabs to selectively engage the plurality of legs.

16. The base as in claim 13, wherein the cover includes an aperture that is aligned with and cooperates with the tubular sleeve to define a central cavity for receiving the vertical mast.

17. The base as in claim 13, wherein an inner end of each of the plurality of legs includes a notched portion, the inner end defining generally vertically disposed first and second curved end surfaces, the second end surface disposed radially outward from the first end surface, the first end surface shaped to correspond with the cylindrical body and the second end surface shaped to correspond with the cover.

18. The base as in claim 13, wherein at least one of the central hub and the plurality of legs are integrally formed of plastic.

19. A merchandise stand comprising:

a central vertical mast;

display apparatus attached to the vertical support for mounting merchandise products thereto; and a base supporting the central vertical mast, the base comprising a central hub having a central cavity for receiving the mast and a plurality of legs removably attached to the central hub, each of the legs projecting outwardly and downwardly from the central hub, each of the legs having a natural resiliency and flexing under load placed on the central mast.

20. The base as in claim 19, wherein outer ends of the plurality of legs define a base width, and wherein the width increases in response to downward force on the central hub to provide increased lateral support and stability.

21. The base as in claim 19, wherein the base provides vertical support to the merchandise stand in two modes including:

a) a normal-load mode wherein the plurality of legs provide the majority of vertical support; and b) a high-load mode wherein the central hub provides the majority of vertical support.

22. The base as in claim 19 wherein each leg flexes against the leg's natural arcuate shape.

23. The base as in claim 19, wherein the plurality of legs support the central hub above the ground a vertical distance D measured from a downward most point of the central hub, and wherein the plurality of legs flex to vary D.

* * * * *